United States Patent [19]
Kisaka

[11] Patent Number: 5,812,339
[45] Date of Patent: Sep. 22, 1998

[54] METHOD AND APPARATUS FOR CONTROLLING THE POSITION OF AN OBJECT ALONG A RADIAL DIRECTION OF A ROTATING BODY

[75] Inventor: Masashi Kisaka, Yokohama, Japan

[73] Assignee: International Business Machines Corporation, Armonk, N.Y.

[21] Appl. No.: 653,622

[22] Filed: May 24, 1996

[30] Foreign Application Priority Data

Jun. 1, 1995 [JP] Japan ..................................... 7-135244

[51] Int. Cl.⁶ .................................................. G11B 5/596
[52] U.S. Cl. ................................... 360/78.09; 360/78.04; 318/562; 364/150
[58] Field of Search ........................... 360/78.04, 78.09; 318/562, 573; 364/150, 164, 165

[56] References Cited

U.S. PATENT DOCUMENTS 5,444,582   8/1995   Suzuki ................................. 360/78.09
5,481,568   1/1996   Yada ........................................ 375/340

FOREIGN PATENT DOCUMENTS 6-139729   5/1994   Japan ................................... 360/78.09
6-215508   8/1994   Japan ................................... 360/78.09

OTHER PUBLICATIONS

Translation of Abstract of Japanese Patent No. JP 401173483A; Inventor Takahashi Applicant: Sony; Application JP 62332933, Filed Dec. 28, 1987, Jul. 10, 1989.

Shingaku Journal, vol. J76–A, No. 3 pp. 364–371, Dec. 1993.

Abstract of German Patent No. DE 004407472A1, Speed and Position Estimator; Inventor—Mark W. Leaper, Nov. 1994.

*Primary Examiner*—Aristotelis M. Psitos
*Assistant Examiner*—Alan Faber
*Attorney, Agent, or Firm*—David W. Lynch

[57] ABSTRACT

A position control method for use with a hard disk drive or other rotating body is provided. A radial position of a rotating body corresponding to an object to be controlled is detected as a current object position. Subsequently, a control operation signal is generated which is representative of a deviation between a target object position expressed in terms of the radial position of the rotating body and the current object position detected. In addition, an actuator manipulation-amount signal is output which is derived from the control operation signal. This actuator manipulation-amount signal is formed by selectively summing an integration signal with either a first or a second control signal. The first control signal is a function of the current object position. The second control signal is a function of a predicted object position at a second predetermined time after generation of the control operation signal. At intervals of a first predetermined time, this process is repeated such that movement of the object by an actuator is controlled by the actuator manipulation-amount signal. A position control apparatus and information recording system which implement this position control method are also provided.

14 Claims, 12 Drawing Sheets

METHOD AND APPARATUS FOR CONTROLLING THE POSITION OF AN OBJECT ALONG A RADIAL DIRECTION OF A ROTATING BODY

FIELD OF THE INVENTION

The present invention relates generally to a position control apparatus and a position control method. More particularly, the present invention relates to a position control method of controlling the position of a controlled object which is moved to a position corresponding to each position along the radial direction of a rotating body by an actuator and to a position control apparatus to which that position control method is applicable.

BACKGROUND OF THE INVENTION

In hard-disk drives (HDDs), a digital closed loop control for controlling the position of a magnetic head is performed by detecting the magnetic head position at intervals of predetermined time and by controlling a current passing through the voice coil of a voice coil motor which moves the magnetic head in accordance with a deviation between the detected current position of the magnetic head and the target position of the magnetic head. FIG. 11 conceptually shows a typical structure of a control elements 72, 74, 76, 78, 80, 82, 90, 112 where, in the closed loop control system of the HDD, a head position signal y(n) representative of a deviation between the current position and target position of the magnetic head is input at intervals of predetermined time and, based on the input head position signal y(n), a motor control signal u(n) is generated and output.

The transfer function H(z) (ratio of z conversion between an input signal and an output signal) of the control elements shown in FIG. 11 is expressed by the following Equation 1. In this control elements, a motor current control signal u(n) is generated and output according to the transfer function of Equation (1), based on the head position signal y(n) input at intervals of predetermined time.

$$H(z) = \frac{k1 + \frac{k2}{z} + \frac{ki}{z-1}}{1 - \frac{k3}{z} - \frac{k4}{z^2}} \cdots \quad \text{(eq. 1)}$$

In a digital closed loop control system for controlling the position of an object, the positioning accuracy for positioning the object relative to its target position is enhanced as a cycle becomes shorter (i.e., the sampling cycle for detecting the object position). However, it is generally known that the sampling cycle cannot be made shorter than a predetermined time because of various limitations. In order for the positioning accuracy to be enhanced without making the sampling cycle shorter, oversampling (where an output is switched at a cycle shorter than a sampling cycle) can be performed. For example, oversampling is used when a digital speech signal is recorded on a compact disk (CD) for subsequent playback as music.

In the reproduction of the speech signal recorded on the CD, during the intermediate period of time between the time that sampling is performed at a certain time and the time that next sampling is performed, a signal is output by predicting a sampling value with interpolation. In the closed loop control system which controls the position of the magnetic head of the HDD, if control is performed by using the predicted value of the head position during the intermediate period of the sampling cycle, as is the above case, then the position of the magnetic head will be able to be controlled finely at a cycle shorter than the sampling cycle. However, since the predicted value of the head position includes a slight error with respect to an actual head position, there is the problem that the positioning accuracy as the magnetic head is positioned to the target position is not always enhanced due to the influence of the above-described error.

More specifically, even if in the HDD the magnetic head were in a steady state where the head position has matched with the target position (deviation=0), an external bias (e.g., a bias that the drive circuit of the voice coil motor has) would occur at all times. For this reason, when the magnetic head is positioned to the target position, an amount of manipulation balancing with the external bias must be output even when the magnetic head is in the steady state of deviation=0, in order to stop the movement of the magnetic head when the head position matches with the target position. Therefore, an element for performing an integration operation is generally added to the control elements which generate and output the motor current control signal u(n). In FIG. 11 a transfer element 150, a one-sample delay element 152, and a summing point 154 correspond to the above-described element for performing an integration operation.

Since, on the other hand, the predicted value of the head position includes an error, as described above, a large error occurs between the amount of manipulation of the integration operation as the detected value of the magnetic head position was used and the amount of manipulation of the integration operation as the predicted value of the magnetic head position was used, and therefore the amount of manipulation by the integration operation changes in an oscillating manner and does not become a fixed value. For this reason, the movement of the magnetic head would not be stopped even if the magnetic head matched with the target position. Also, the movement of the magnetic head would be stopped before the magnetic head matches with the target position. Also, the magnetic head, which has already matched with the target position, would be moved to a position departed from the target position. It is therefore difficult to position the magnetic head to the target position with a high degree of accuracy.

A need exists for a position control apparatus and method which is capable of enhancing the positioning accuracy as an object to be controlled is positioned to its target position.

The present invention provides a solution to this and other problems, and offers other advantages over the prior art.

SUMMARY OF THE INVENTION

A position control method for use with a hard disk drive or other rotating body is provided. A radial position of a rotating body corresponding to an object to be controlled is detected as a current object position. Subsequently, a control operation signal is generated which is representative of a deviation between a target object position expressed in terms of the radial position of the rotating body and the current object position detected. In addition, an actuator manipulation-amount signal is output which is derived from the control operation signal. This actuator manipulation-amount signal is formed by selectively summing an integration signal with one of a first and a second control signal. The first control signal is a function of the current object position derived from the control operation signal. The second control signal is a function of a predicted object position at a second predetermined time after generation of the control operation signal which is derived from the control operation signal. At intervals of a first predetermined time, this process is repeated such that movement of the object by an actuator is controlled by the actuator manipulation-amount signal.

A position control apparatus and information recording system which implement this position control method are also provided.

Alternatively, the preferred embodiment position control apparatus of the present invention for overcoming the above problem can be described as comprising a detector for detecting a radial position of a rotating body that an object to be controlled corresponds to, as a current position of said object to be controlled, at intervals of first predetermined time; signal output for outputting a control operation signal representative of a deviation between a target position of said object expressed in terms of the radial position of said rotating body and the current position of said object detected by said detector, at intervals of said first predetermined time; and controller for controlling a movement of said object by an actuator, by outputting, when the control operation signal is output from said signal, a manipulation-amount signal representative of an amount of manipulation where amounts of manipulation each corresponding to said control operation signal, executed by a plurality of control operations including an integration operation for matching the position of said object with said target position, are summed up, and then by switching an amount of manipulation executed by the control operations other than said integration operation after a second predetermined time shorter than said first predetermined time and outputting the manipulation-amount signal representative of an amount of manipulation where amounts of manipulation executed by said plurality of control operations are summed up.

Also, in the alternative description of the present invention preferred embodiment apparatus, said rotating body may be a data recording medium where a plurality of concentric circular tracks are formed and where data can be recorded on each track, and said object to be controlled may be a head which is provided with at least a function of reading out said data recorded on the tracks of said rotating body.

Also, in the alternative description of the present invention preferred embodiment apparatus, said data recording medium may be a magnetic disk of a hard-disk drive, and said head may be a magnetic head of the hard-disk drive which is provided with at least a function of reading out said data recorded on a track of said magnetic disk.

Also, in the alternative description of the present invention preferred embodiment apparatus, the second predetermined time may be integer fraction (e.g., 1/n, where n is an integer) of the first predetermined time.

Also alternatively, the position control method according to the present invention can be described as comprising the steps of detecting a radial position of a rotating body that an object to be controlled corresponds to, as a current position of said object to be controlled; generating a control operation signal representative of a deviation between a target position of said object expressed in terms of the radial position of said rotating body and the current position of said object detected; outputting a manipulation-amount signal representative of an amount of manipulation where amounts of manipulation each corresponding to the control operation signal, executed by a plurality of control operations including an integration operation for matching the position of said object with said target position, are summed up, at intervals of first predetermined time, and also, after a second predetermined time shorter than said first predetermined time elapses from the time said manipulation-amount signal is output, switching an amount of manipulation executed by the control operations other than said integration operation and repeating outputting the manipulation-amount signal representative of an amount of manipulation where amounts of manipulation executed by said plurality of control operations are summed up, thereby controlling a movement of said object by an actuator.

Also, in the alternative description of the position control method according to the present invention, the second predetermined time may an integer fraction (e.g., 1/n, where n is an integer) of the first predetermined time.

These and various other features as well as advantages which characterize the present invention will be apparent upon reading of the following detailed description and review of the associated drawings.

DETAILED DESCRIPTION

In Equation 1, which represents the transfer function of the control elements which generate and output a manipulation-amount signal with a control operation signal representative of a deviation between the target position and current position of an object to be controlled, if the integration operation of a plurality of control operations, which the transfer function represents, and the control operations other than the integration operation are separated, then Equation 1 will be converted into Equation 2 which can be expressed as the sum of two transfer functions.

$$G(z) = \frac{k1 + \frac{k2}{z}}{1 - \frac{k3}{z} - \frac{k4}{z^2}} + \frac{ki}{z-1} \cdots \quad \text{(eq. 2)}$$

Figure 12:
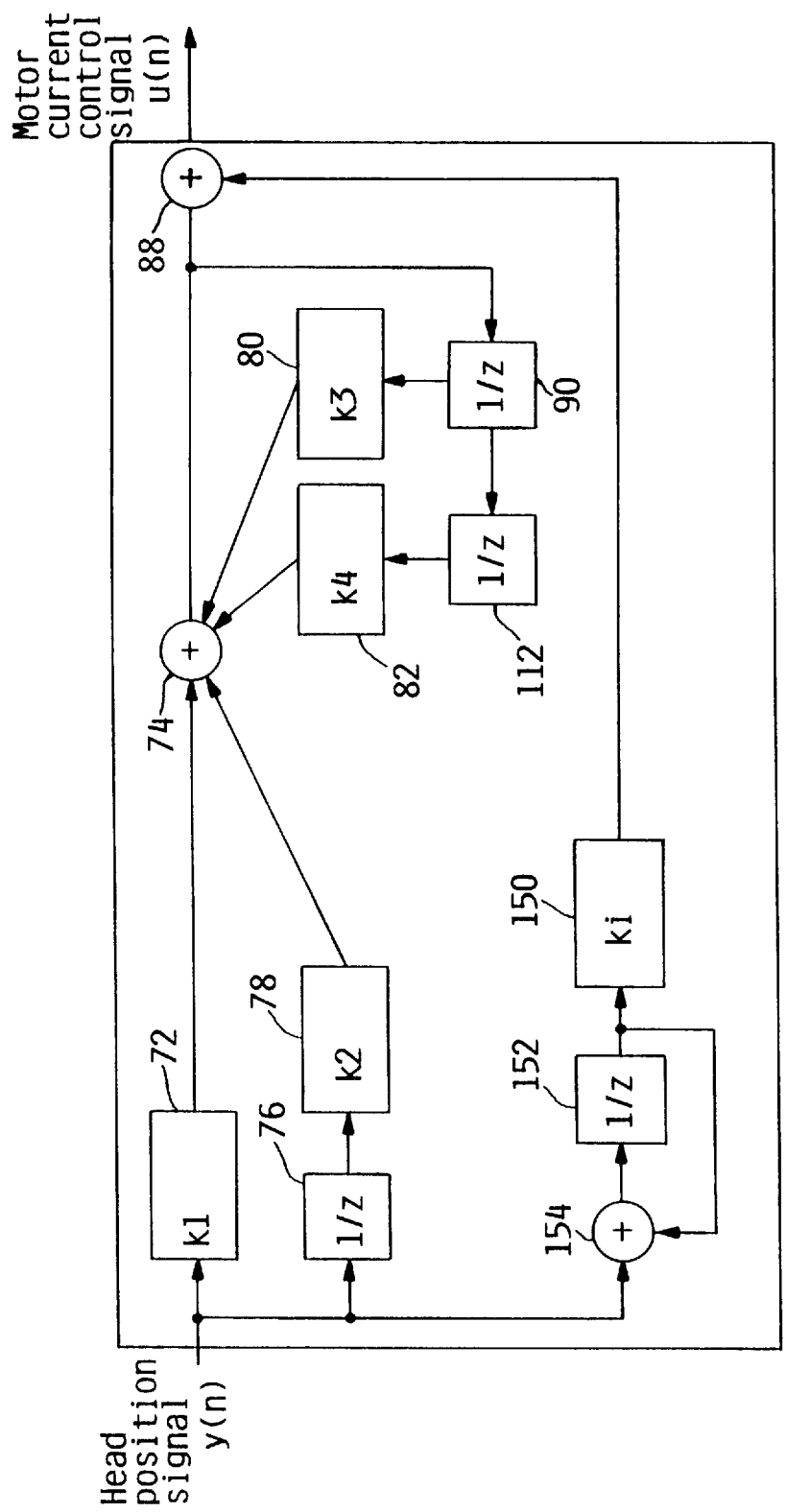
FIG. 12 is a block diagram conceptually showing the structure where the section for performing an integration operation has been removed from the control elements of FIG. 11.

In Equation 2, the second term represents a transfer function corresponding to the integration operation and the first term represents a transfer function corresponding to the operations other than the integration operation. For reference, the structure of the control elements, 72, 74, 76, 78, 80, 82, 88, 90, 112 where the transfer function is expressed by Equation 2, is shown in a block diagram of FIG. 12. In Equation 2, since, in the steady state where the current position of an object to be controlled has matched with the target position, the influence of the value of the first term of Equation 2 is small with respect to an amount of manipulation obtained by the above-described transfer function, if the value of the second term is appropriate, then a controlled object will be able to be controlled with a high degree of accuracy so that the position of the object can match with the target position.

Based on the above, in a preferred embodiment of the present invention the current position of an object to be controlled is detected at intervals of first predetermined time by the detector. From the signal output, a control operation signal representative of a deviation between a target position of the object and the current position of the detected object is output at intervals of the first predetermined time. If the control operation signal is output from the signal output, the controller will output a manipulation-amount signal representative of an amount of manipulation where amounts of manipulation each corresponding to the control operation signal, executed by a plurality of control operations including an integration operation for matching the position of the object with the target position, are summed up. Then, an amount of manipulation executed by the control operations other than the integration operation is switched after a second predetermined time shorter than the first predetermined time, and the manipulation-amount signal representative of an amount of manipulation, where amounts of manipulation executed by the plurality of control operations are summed up, is output. With this, the movement of the object by an actuator is controlled.

In accordance with the above, the amount of manipulation by the integration operation is switched according to the deviation between the target position of the object and the detected current position of the object, at intervals of the first predetermined time. Therefore, the amount of manipulation by the integration operation does not include a predicted error, which will be caused by prediction of the current position of the object to be controlled, and will become an appropriate value balancing with an external bias if the current position of the object matches with the target position. Also, when the current position of the object matches with the target position, the amount of manipulation by the control operations other than the integration operation (to which the result of the calculation of the first term of Equation 2 corresponds) has a little influence on the above-described amount of manipulation where amounts of manipulation by a plurality of control operations are summed up, as described above. Therefore, a manipulation-amount signal representative of an amount of manipulation substantially equal to an appropriate amount of manipulation balancing with an external bias, based on the integration operation, is to be output as a manipulation-amount signal at intervals of time shorter than the first predetermined time.

Thus, in the preferred embodiment of the present invention, when the current position of a controlled object matches with its target position or is in its steady state, since a manipulation-amount signal representative of an amount of manipulation equal to or substantially equal to an appropriate amount of manipulation balancing with an external bias is output at intervals of time shorter than a conventional control cycle (first predetermined time), the positioning accuracy as the object is positioned to the target position is enhanced.

If it is considered only to position a controlled object to its target position, then the switching of an amount of manipulation, which is performed by the control operations other than the integration operation after the second predetermined time shorter than the first predetermined time elapses from the time that a manipulation-amount signal is output according to the control operation signal output by the signal output, may be made so that the amount of manipulation by the control operations other than the integration operation becomes zero. But, if at the same time there is considered a case where, from the state that there is a great deviation between the current position and target position of the object to be controlled, the object is moved and positioned to the target position, then the amount of manipulation by the control operations other than the integration operation may be switched to an amount of manipulation corresponding to the predicted position of the object as the second predetermined time elapses, or the transfer function of the control operations other than the integration operation may be preset so that the evaluation by a predetermined evaluation function becomes optimum and may be switched to an amount of manipulation which is obtained by the above-described transfer function. With this, even when there is a great deviation between the current position and target position of the object to be controlled, the movement of the object can be finely controlled at intervals of short time.

Also, in the preferred embodiment of the present invention, the rotating body may be a data recording medium where a plurality of concentric circular tracks are formed and where data can be recorded on each track, and the object to be controlled may be a head which is provided with at least a function of reading out the data recorded on the rotating body. Also, the data recording medium may be a magnetic disk of a hard-disk drive, and the head may be a magnetic head of the hard-disk drive which is provided with at least a function of reading out the data recorded on a track of the magnetic disk.

Also, in a preferred embodiment position control method according to the present invention, the current position of an object to be controlled is detected, and a control operation signal representative of a deviation between the target position of the object and the detected current position of the object is generated. A manipulation-amount signal representative of an amount of manipulation, where amounts of manipulation each corresponding to the control operation signal, executed by a plurality of control operations including an integration operation for matching the position of the object with the target position, are summed up, is output at intervals of first predetermined time, and also, after a second predetermined time shorter than the first predetermined time elapses from the time the manipulation-amount signal is output, an amount of manipulation executed by the control operations other than the integration operation is switched. And, outputting the manipulation-amount signal representative of an amount of manipulation, where amounts of manipulation executed by the plurality of control operations are summed up, is repeated. With this, the movement of the object by an actuator is controlled. Accordingly, as with the above, the positioning accuracy as the object to be controlled is positioned to the target position can be enhanced.

A preferred embodiment of the present invention will hereinafter be described in detail with reference to the accompanying drawings. Note that the preferred embodiment described with certain numerical values, but is not limited to only using the numerical values described hereinafter.

Figure 1:
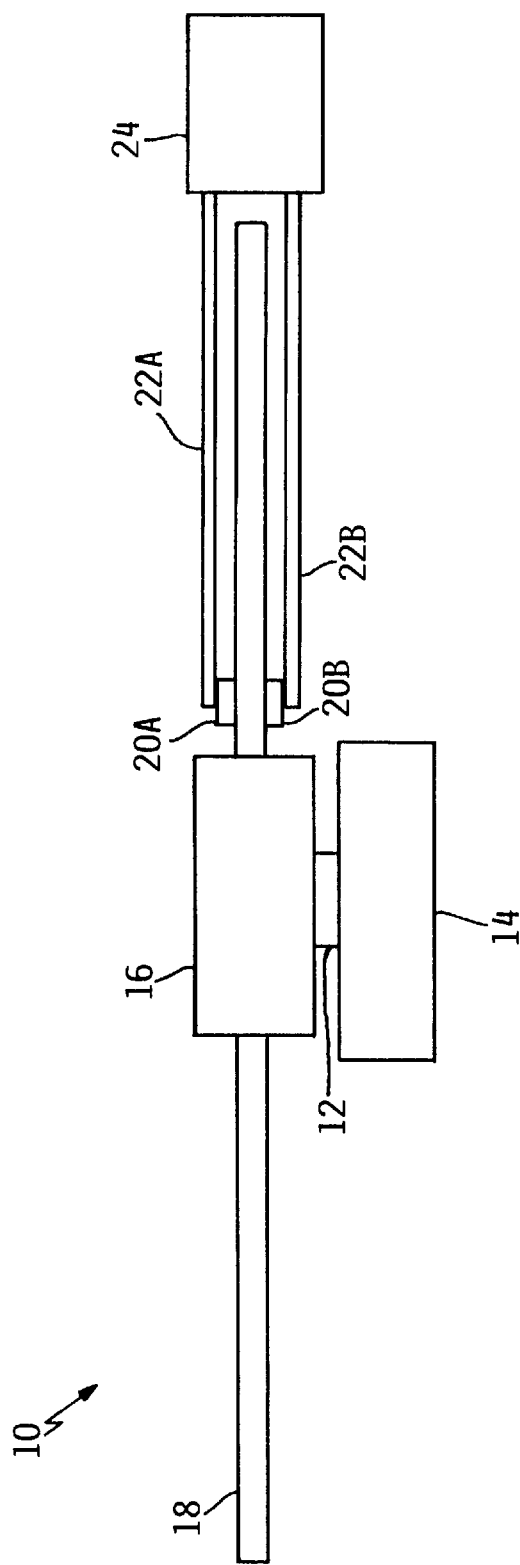
FIG. 1 is a schematic view showing a hard disk drive according to an embodiment of the present invention.

FIG. 1 shows a hard disk drive 10 according to this embodiment of the present invention. The hard disk drive 10 is provided with a drive unit 14, which will spin a shaft 12 at constant high speed if power is applied. The shaft 12 has attached thereto a cylindrical spindle 16 so that the axes thereof are vertically aligned with each other. On the outer peripheral surface of the spindle 16 there are mounted a disk 18.

The disk 18 has a disk shape with a predetermined thickness dimension and is formed with hard material. Both sides of the disk are coated with magnetic material and used as recording surfaces. The central portion of the disk 18 is formed with a hole having the substantially same diameter as the outer diameter of the spindle 16. The spindle 16 is inserted into the center hole of the disk 18, and the disk 18 is fixed to the outer peripheral surface of the spindle 16. Therefore, if power is applied to the hard disk drive 10 and the shaft 12 is rotated by the drive unit 14, then the disk 18 will be rotated together with the spindle 16.

Figure 2:
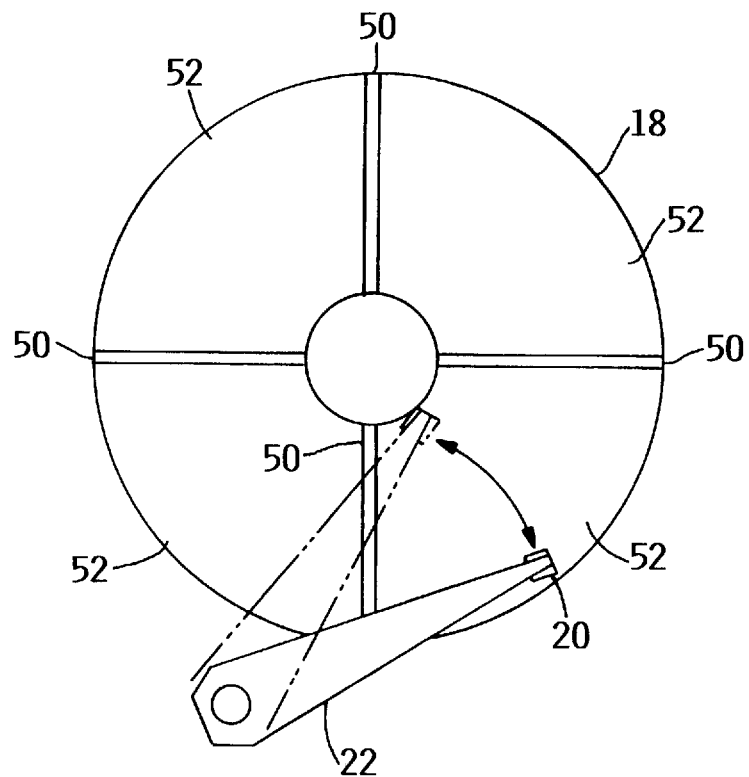
FIG. 2 is a plan view of the disk showing burst pattern recorded areas.
Figure 3:
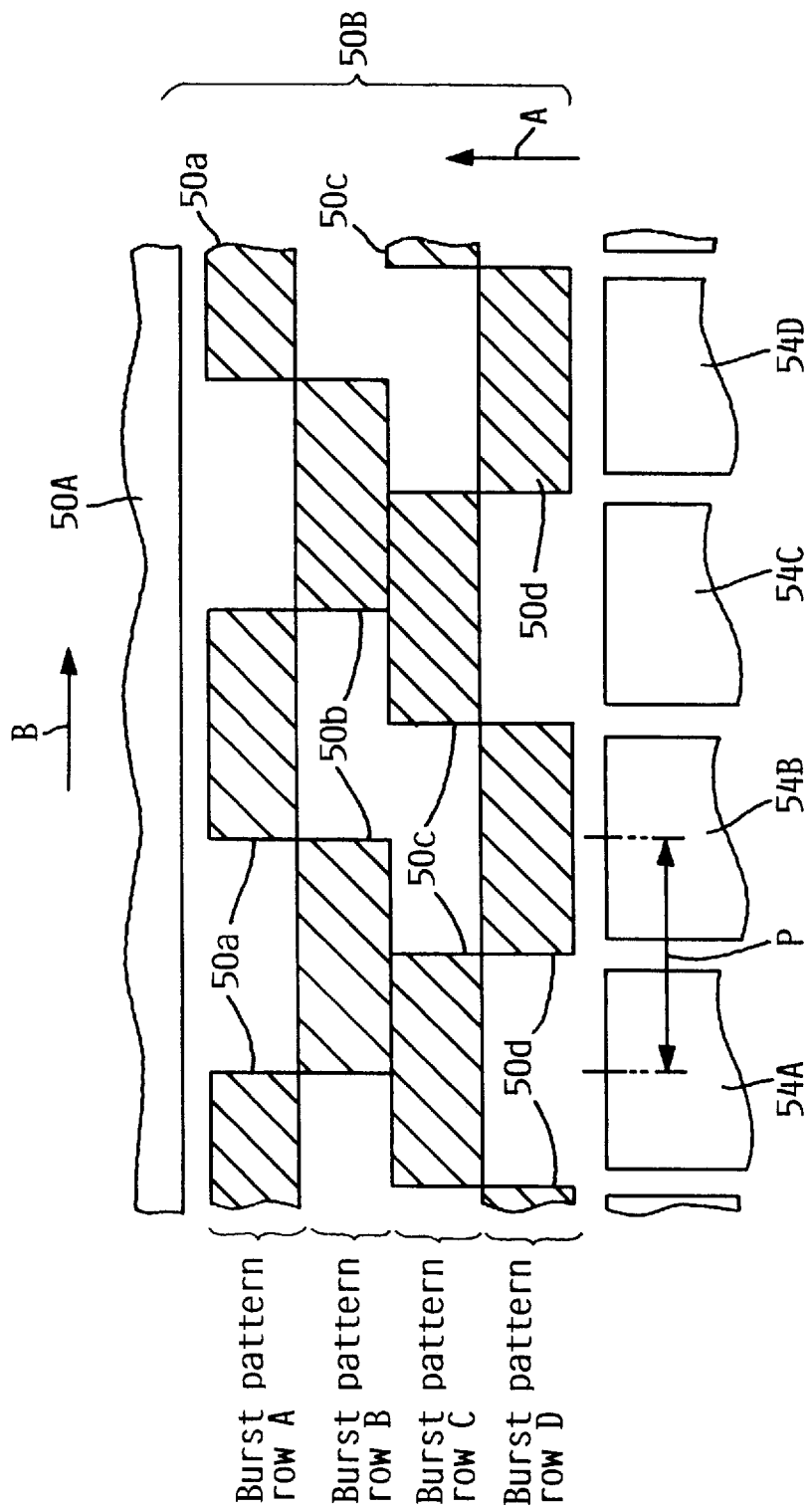
FIG. 3 is a plan view showing the data tracks and the burst patterns recorded on the burst pattern recorded area.

On each recording surface of the disk 18 a plurality of position detection data recorded areas 50 are radially formed along the radial direction of the disk 18, as shown in FIG. 2. On the remaining areas there are formed a plurality of data track areas 52. In FIG. 3 there are shown a portion of the position detection data recorded area 50 and a portion of the data track area 52. On the data track area 52 a plurality of data tracks are concentrically formed at intervals of pitch P, and FIG. 3 shows the data tracks 54A to 54C. Data is written to or read from each data track 54 along the circumferential direction (indicated by arrow A in FIG. 3) of the disk 18 with a magnetic disk to be described later.

On the other hand, on the position detection data recorded area 50 there are provided a track identification data recorded area 50A and a burst pattern recorded area 50B. On the track identification data recorded area 50A, track identification data, which represents the track address of each data track in Gray code (cyclic binary code) in correspondence with each data track 54, is recorded. Also, on the burst pattern recorded area 50B there are formed burst patterns. As shown in FIG. 3, the burst patterns consist of four burst pattern rows (burst pattern rows A to D) where signal recorded areas (hatched portions in FIG. 3) are arranged in the direction of the arrangement of the data track 54, i.e., along the radial direction of the disk 18. The length of each signal recorded area in the radial direction of the disk 18 and the space between adjacent signal recorded areas are equal to the pitch P between adjacent data tracks.

The signal recorded areas 50a of the burst pattern row A and the signal recorded areas 50b of the burst pattern row B are arranged in a zigzag manner along the radial direction of the disk 18, and the both ends of each signal recorded area in the radial direction of the disk correspond to the centers of the data tracks 54 in the width direction thereof. The burst pattern rows A and B are formed by recording a signal on each area. The signal recorded areas 50c of the burst pattern row C and the signal recorded areas 50d of the burst pattern row D are arranged in a zigzag manner along the radial direction of the disk 18, and the both ends of each signal recorded area in the radial direction of the disk correspond to the boundary between adjacent data tracks. The burst pattern rows C and D are formed by recording a signal on each area.

Also, as shown in FIG. 1, the hard disk drive 10 further includes magnetic heads 20A and 20B provided in correspondence with the recording surfaces of the disk 18. Each of the magnetic heads 20A and 20B includes a read element (not shown) which reads data from the recording surface with an MR element and also includes a write element (not shown) which writes data to the recording surface with a coil. The magnetic head 20A is mounted on one end of an access arm 22A and held in a position slightly (for example, about 0.1 to 0.2 microns) spaced from the corresponding record surface of the disk 18. Likewise, the magnetic head 20B is mounted on one end of an access arm 22B and held in a position slightly (for example, about 0.1 to 0.2 microns) spaced from the corresponding record surface of the disk 18. The other end of each of the access arms 22A and 22B is mounted on a drive unit 24.

The drive unit 24 includes voice coil motors 26 (see FIG. 4) which are provided in correspondence with the access arms 22A and 22B to move the arms. If the voice coil motors 26 are driven by a micro processing unit to be described later, the access arms 22A and 22B will be moved so that the magnetic heads 20A and 20B move along the radial direction of the disk 18. With this arrangement, the magnetic heads 20A and 20B can be positioned over desired positions on the recording surfaces of the disk 18.

Figure 4:
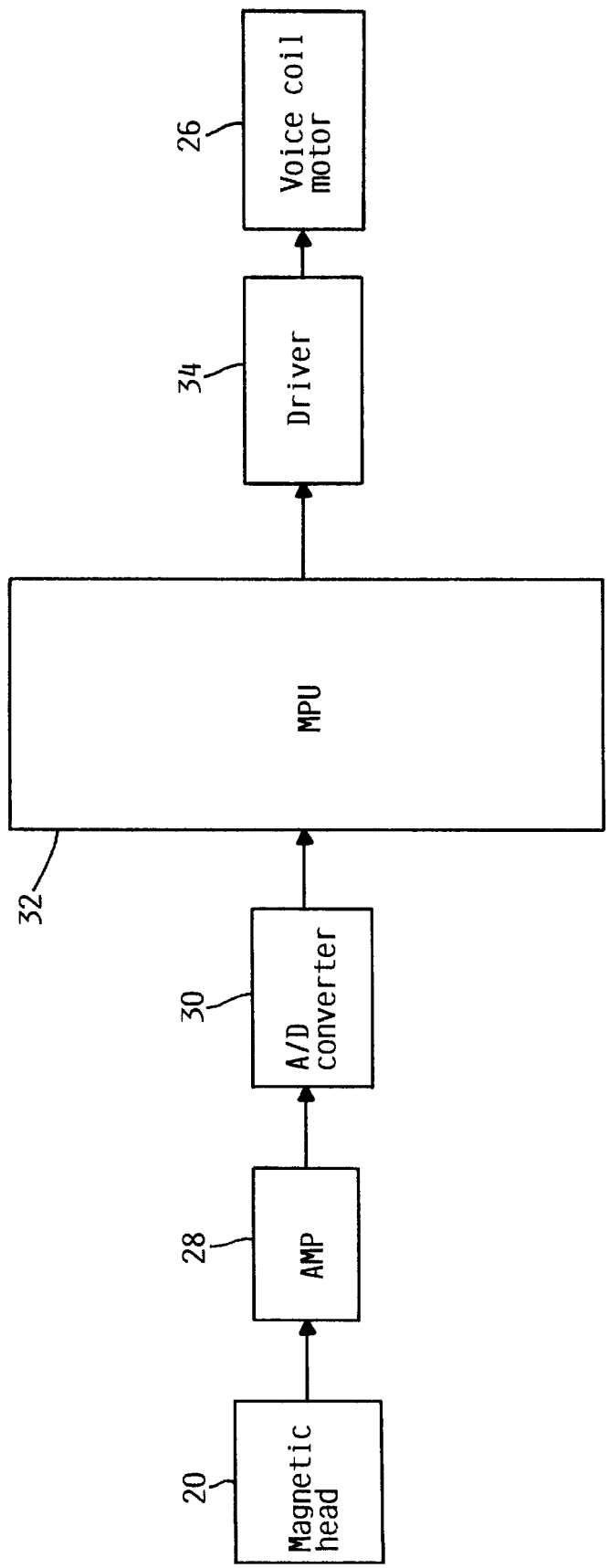
FIG. 4 is a block diagram showing the MPU, magnetic head, and peripheral connection relationship of the hard disk drive.

The magnetic heads 20A and 20B are connected to each of the circuits shown in FIG. 4. That is, the signal output terminal of the magnetic head 20 is connected to the input terminal of an amplifier 28 so that the signal output from the read element of the magnetic head 20 is amplified with the amplifier 28. The output terminal of the amplifier 28 is connected to the input terminal of an analog-digital (A/D) converter 30. The output terminal of the A/D converter 30 is connected to the signal input terminal of a micro processing unit (MPU) 32, so the analog signal output from the amplifier 28 is converted into a digital signal with the A/D converter 30 and output to the MPU 32.

The MPU 32 decides the position of the magnetic head 20, based on the signal input from the A/D converter 30. According to the deviation between the decided position of the magnetic head 20 and the target position of the magnetic head 20, the MPU 32 generates a digital signal for controlling the position of the magnetic head 20 (more specifically, motor current control signal for controlling a current passing through the voice coil of the voice coil motor 26), as will be described later, and outputs the digital signal to a driver 34 connected to the MPU 32. Based on the input signal, the driver 34 controls a current passing through the voice coil of the voice coil motor 26. With this arrangement, the magnetic head 20 is moved so that the position of the magnetic head 20 matches with the target position.

Figure 5:
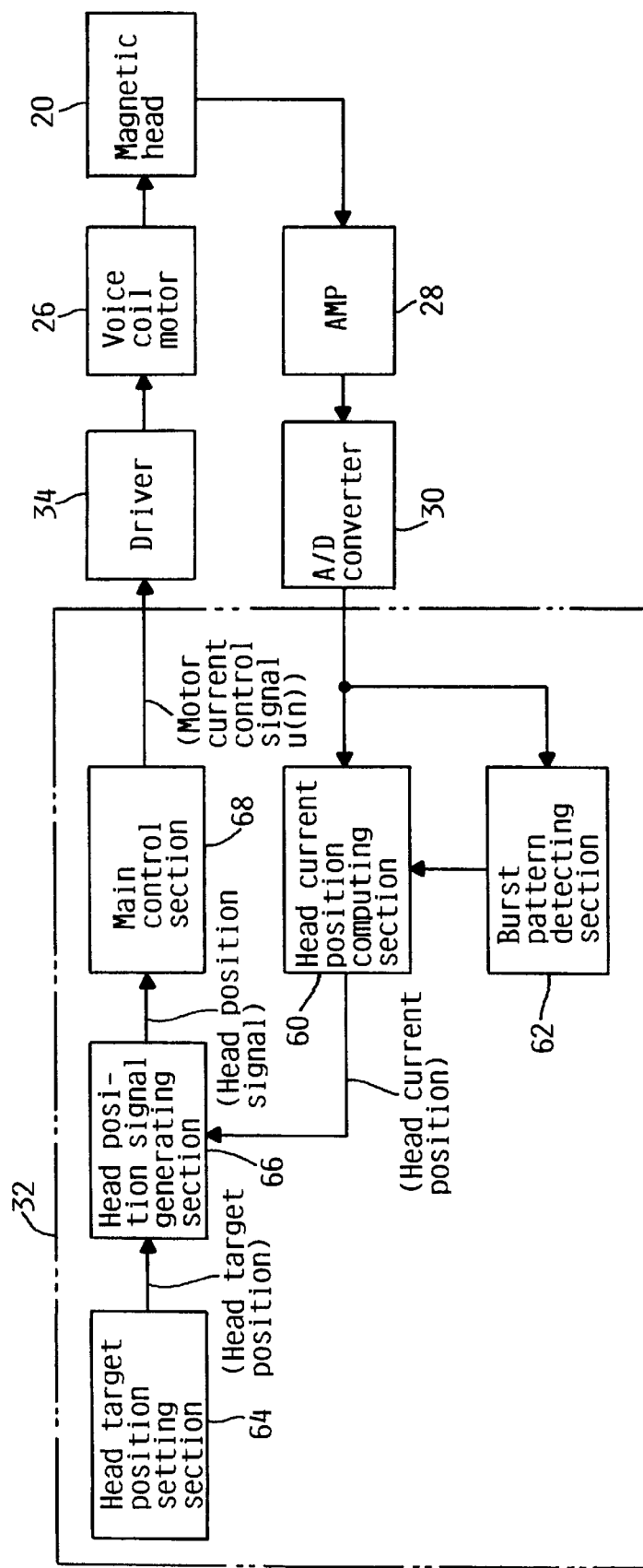
FIG. 5 is a functional block diagram showing each function of a control system for controlling the magnetic head so that the position of the head can follow the data track, in the MPU.

The operation of this embodiment will be described. In FIG. 5, among various functions the MPU 32 has, there is shown each function of a control system for realizing functions which control the position of the magnetic head 20.

The signal output from the A/D converter 30 is input to a head current position computing section 60 and a burst pattern detecting section 62. The burst pattern detecting section 62 decides if the magnetic head 20 corresponds to the burst pattern recorded area 50B, based on the input signal, and outputs the result of the decision to the head current position computing section 60. The head current position computing section 60 fetches a signal from the A/D converter 30, when the magnetic head 20 is decided to correspond to the burst pattern recorded area 50B by the burst pattern detecting section 62. Based on that signal from the A/D converter, the head current position computing section 60 computes and outputs a position along the radial direction of the disk 18 that the magnetic head 20 currently corresponds to, i.e., the current position of the magnetic head 20. Therefore, from the head current position computing section 60, the head current positions are output at intervals of predetermined cycle (sampling cycle, Ts, corresponds to a first predetermined time).

Also, a head target position setting section 64 sets and outputs the target position of the magnetic head 20 which is expressed in terms of a position along the radial direction of the disk 18. When there is an offset or shift of the longitudinal center position of each of the gaps corresponding to the read and write elements of the magnetic head 20, the head target position setting section 64 sets and outputs values which are different between the time that data is read from the data track 54 and the time that data is written to the data track 54 as the target position of the magnetic head 20. For example, when data is read out, one value is set and output so that the center of the gap of the read element is aligned with the center of the data track 54, and when data is written in, another value is set and output so that the center of the gap of the write element is aligned with the center of the data track 54.

The head current position output from the head current position computing section 60 and also the head target position output from the head target position setting section 64 are input to a head position signal generating section 66. The head position signal generating section 66 compares the input head current position and head target position, and outputs a head position signal y(n) which represents the size and direction of the deviation of the head current position to the head target position (whether the head current position with respect to the head target position is shifted toward the inner circumferential side or outer circumferential side of the disk 18) in terms of a digital value, at intervals of sampling cycle Ts.

Note that the head position signal y(n) corresponds to the control operation signal. The burst pattern detecting section 62 and the head current position computing section 60 correspond to the detector. The head position signal generating section 66 corresponds to the signal output.

Figure 6:
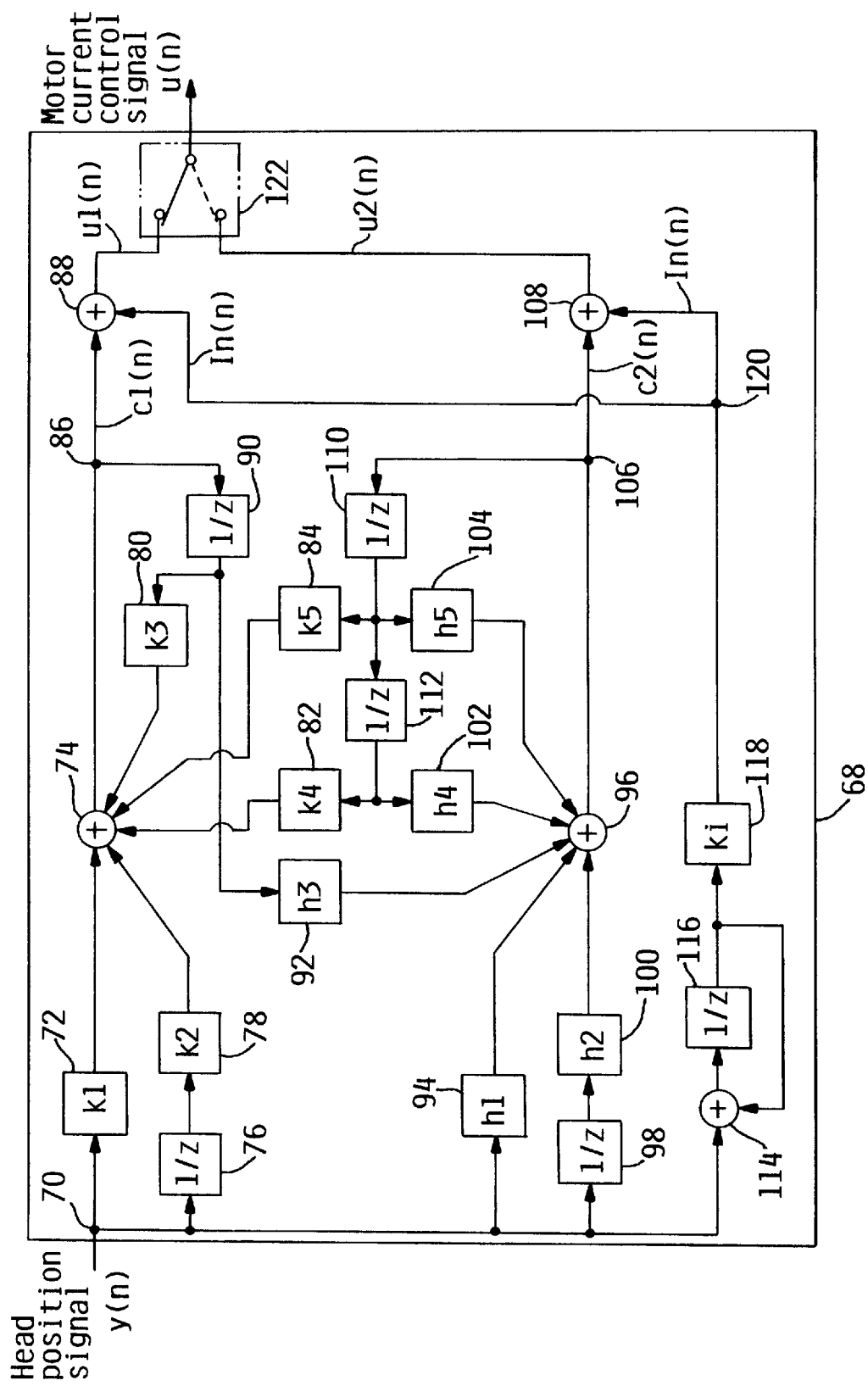
FIG. 6 is a block diagram showing an example of the main control section conceptually from the relationship between the input and output generated by the processing of the main control section.

The head position signal y(n) output from the head position signal generating section 66 is input to a main control section 68, which corresponds to the controller. FIG. 6 shows the processing of the main control section 68 conceptually from the relationship between the input and output generated by that processing.

As shown in FIG. 6, the head position signal y(n) is input to a transfer element 72 where the transfer function is k1, through an outgoing point 70. The signal output from the transfer element 72 is input to a summing point 74. Also, the head position signal y(n) is input to a one-sample delay element 76 where the transfer function is 1/z, through the outgoing point 70. The signal output from the one-sample delay element 76 is input to a transfer element 78 where the transfer function is k2. The signal output from the transfer element 78 is input to the summing point 74. Also, the signals, which are output from a transfer element 80 where the transfer function is k3, a transfer element 82 where the transfer function is k4, and a transfer element 84 where the transfer function is k5, are input to the summing point 74.

The summing point 74 outputs a first control signal c1(n) equivalent to the sum of the signals output from the transfer elements 72, 78, 80, 82, and 84. This first control signal c1(n) is input to a summing point 88 through an outgoing point 86 and also to a one-sample delay element 90 where the transfer function is 1/z. The signal output form the one-sample delay element 90 is input to the above-described transfer element 80 and a transfer element 92 where the transfer function is h3.

Also, the head position signal y(n) is input to a transfer element 94 where the transfer function is h1, through the outgoing point 70. The signal output from the transfer element 94 is input to a summing point 96. Further, the head position signal y(n) is input to a one-sample delay element 98 where the transfer function is 1/z, through the outgoing point 70. The signal output from the one-sample delay element 98 is input to a transfer element 100 where the transfer function is h2. The signal output from the transfer element 100 is input to the summing point 96. Also, the signals, which are output from the above-described transfer element 92, a transfer element 102 where the transfer function is h4, and a transfer element 104 where the transfer function is h5, are input to the summing point 96.

The summing point 96 outputs a signal which is equivalent to the sum of the signals input from the transfer elements 92, 94, 100, 102, and 104. This signal is output as a second control signal c2(n) to a summing point 108 through an outgoing point 106 and is also input to a one-sample delay element 110 where the transfer function is 1/z. The signal output from the one-sample delay element 110 is input to the above-described transfer elements 84, 104 and a one-sample delay element 112 where the transfer function is 1/z. The signal output from the one-sample delay element 112 is input to the above-described transfer elements 82 and 102.

Further, the head position signal y(n) is input to a summing point 114 through the outgoing point 70. The signal output from the summing point 114 is input to a one-sample delay element 116 where the transfer function is 1/z. The signal output from the one-sample delay element 116 is input to the summing point 114 and a transfer element 118 where the transfer function is ki. Note that the integration operation in the main control section 68 is performed by the summing point 114, the one-sample delay element 116, and the transfer element 118, and the transfer element 118 outputs an integration signal in(n) representative of an amount of manipulation which is executed according to the head position signal y(n) by the integration operation. The integration signal in(n) output from the transfer element 118 is input to summing points 88 and 108 through an outgoing point 120.

The summing point 88 outputs a signal which is equivalent to the sum of the first control signal c1(n) input from summing point 74 and the integration signal in(n) input from the transfer element 118. This signal is input as a first motor control signal u1(n) to a switching section 122. Also, the summing point 108 outputs a signal which is equivalent to the sum of the second control signal c2(n) input from a summing point 96 and the integration signal in(n) input from the transfer element 118. This signal is input as a second motor control signal u2(n) to the switching section 122.

FIG. 6 conceptually shows the switching section 122 as a switch. The switching section 122 selectively outputs either the first motor control signal u1(n) or second motor control signal u2(n) as a motor current control signal u(n) which represents a control amount of motor current in terms of a digital value, at timings to be described later. The motor current control signal u(n) corresponds to the manipulation-amount signal.

Figure 7:
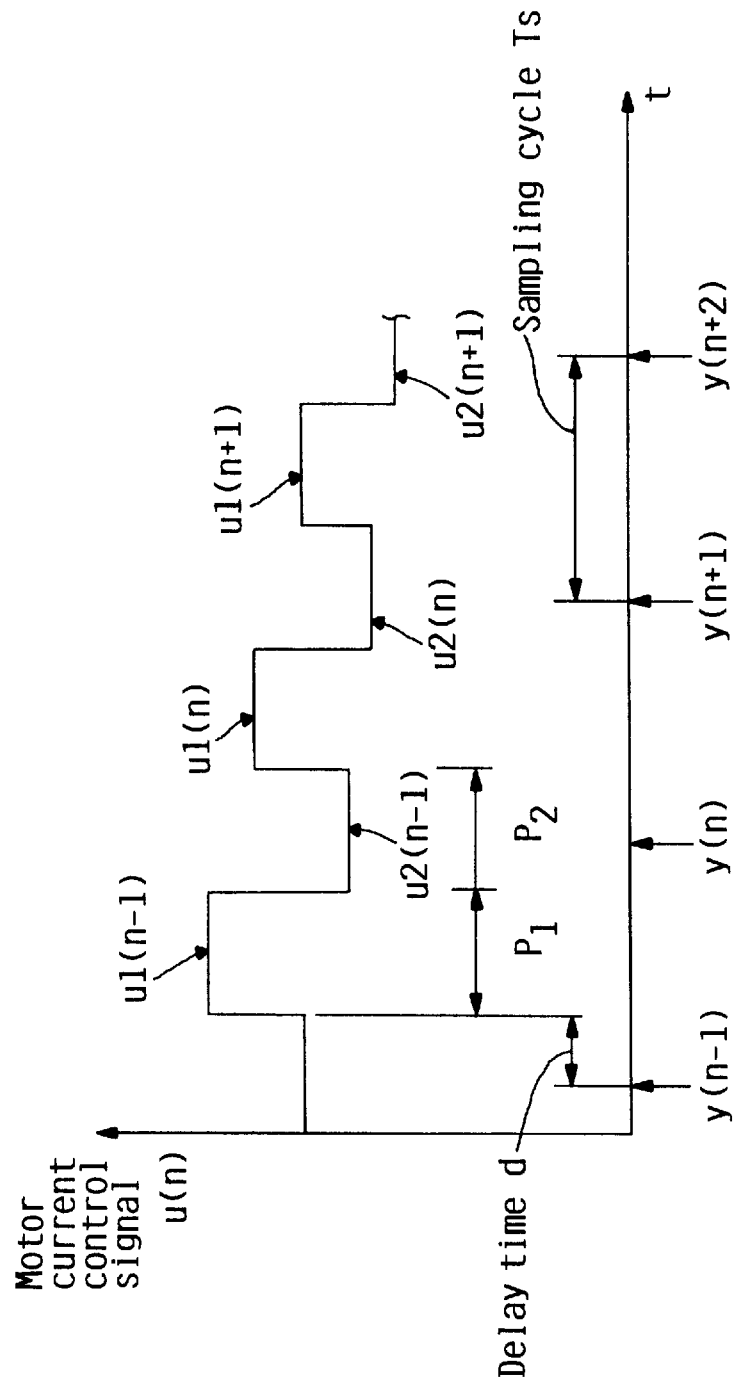
FIG. 7 is a timing diagram showing the timing at which first and second motor control signals u1(n) and u2(n) are output as motor current control signals u(n) from the main control section.

More specifically, the head position signal y(n) is input to the main control section 68 at intervals of sampling cycle Ts, as shown in FIG. 7, but if the delay time d caused by calculation elapses from the time the head position signal y(n) is input at a certain timing and if the first and second motor control signals u1(n) and u2(n) corresponding to that head position signal y(n) are input, then the first motor control signal u1(n) will first be output as a motor control signal u(n). Then, a signal to be output as the motor control signal u(n) is switched to the second control signal u2(n) after a predetermined time p1, which is shorter than the sampling cycle Ts, elapses from the time the first motor control signal u1(n) is output. In this embodiment, the predetermined time p1 is Ts/2 and corresponds to a second predetermined time.

During the period of time that this second motor control signal u2(n) is being output, the head position signal y(n+1) of next cycle is input. And, a signal, which is to be output as the motor current control signal u(n+1), will be switched to the first motor control signal u1(n+1) if a predetermined time p2 elapses from the time the second motor control signal u2(n+1) is output. In this embodiment, the predetermined time p2 is p1=Ts/2 and is a delay time d from the time the head position signal y(n+1) is input.

Note that the block diagram described above has conceptually shown the processing which is performed in the main control section 68. In fact, predetermined processing routine is executed in the MPU 32, based on the head position signal y(n) input from the head position signal generating section 66. As a result, a signal equal to the output signal of the switching section 122 is generated and output to a driver 34 as a motor current control signal u(n).

In the main control section 68, the first control signal c1(n) output from the summing point 74 and the second control signal c2(n) output from the summing point 96 are signals representative of an amount of manipulation where amounts of manipulation executed by control operations other than the integration operation of the controller are summed up. Also, in the switching section 122, the first motor control signal u1(n) where the integration signal in(n) has been added to the first control signal c1(n) and the second motor control signal u2(n) where the integration signal in(n) has been added to the second control signal c2(n) are switched at intervals of predetermined time p1 (=p2), and one of them is output as the motor current control signal u(n). In the signal switching by the switching section 122, an amount of manipulation by the control operation other than the integration operation is switched after the predetermined time p1 shorter than the sampling cycle Ts, and a manipulation-amount signal (i.e., second motor control signal u2(n)) representative of an amount of manipulation, where amounts of manipulation by a plurality of control operations are summed up, is output.

Incidentally, the first control signal c1(n) and the second control signal c2(n) are expressed by the following Equations 3 and 4.

$$c1(n)=k1·y(n)+k2·y(n-1)+k3·c1(n-1)+k5·c2(n-1)+k4·c2(n-2) \text{ (eq. 3)}$$

$$c2(n)=h1·y(n)+h2·y(n-1)+h3·c1(n-1)+h5·c2(n-1)+h4·c2(n-2) \text{ (eq. 4)}$$

When in Equations 3 and 4 k1=h1, k2=h2, k3=h3, k4=h4, k5=h5=0, since c1(n) and c2(n) of Equation 3 become equal (each matches with the first term of Equation 2), the cycle of the change of the motor current control signal u(n) matches with the sampling cycle regardless of the signal switching by the switching section 122 and becomes equal to a case where oversampling is not performed.

However, in this embodiment of the present invention, the values of the constants k1, k2, k3, k4, and k5 of Equation 3 (transfer functions of transfer elements 72, 78, 80, 82, and 84) and the values of the constants h1, h2, h3, h4, and h5 of Equation 4 (transfer functions of transfer elements 94, 100, 92, 102, and 104) have been set by a least squares method so that an evaluation value obtained by a certain evaluation function becomes minimum (optimum value). With this, in order for the magnetic head 20 to match with its target position in accordance with the deviation between the current position and target position of the magnetic head 20, since the first and second motor control signals u1(n) and u2(n) are alternately output (oversampling) as a motor current control signal u(n) at intervals of cycle of ½ of the sampling cycle Ts (predetermined time, p=p1=p2), the positioning of the magnetic head 20 can be finely controlled.

On the other hand, since the integration signal in(n) representative of an amount of manipulation executed by the integration operation, which is output from the transfer element 118, is switched at intervals of sampling cycle Ts in accordance with the head position signal y(n) which is input at intervals of sampling cycle Ts, the integration signal in(n) will not include a prediction error, which would be caused by predicting the position of the magnetic head 20, and will become an appropriate value balancing with an external bias if the magnetic head 20 matches with its target position. When the magnetic head 20 matches with the target position thereof, since the influence on the first motor control signal u1(n) by the first control signal c1(n) becomes small and also the influence on the second motor control signal u2(n) by the second control signal c2(n) becomes small, a signal substantially matching with the integration signal in(n) is to be output as a motor current control signal u(n) at intervals of cycle of ½ of the sampling cycle Ts (predetermined time, p).

Therefore, when the position of the magnetic head 20 matches and has matched with the target position (a stable state), since the motor current control signal u(n), which represents an amount of manipulation equal to or substantially equal to an amount of manipulation balancing with an external bias, as in the prior art, is output at a cycle shorter than the prior art, the external bias can be compensated accurately and also the frequency components other than the external bias are compensated by oversampling. As a result, the magnetic head 20 can be positioned to the target position with a high degree of accuracy.

When, in the closed loop control system for controlling the position of the magnetic head 20, white noise is input as an external disturbance, calculate an optimum solution for making the dispersion of the position of the magnetic head minimum. Suppose now that the target position of the magnetic head is constant and, in the state that the position of the magnetic head has matched with the target position, as shown in FIG. 8, white noise v(n) has been added to each of the summing points 88 and 108 of the main control section 68, and white noise w(n) has been added to a summing point 130 which is provided for convenience on the input side of the main control section 68.

Figure 8:
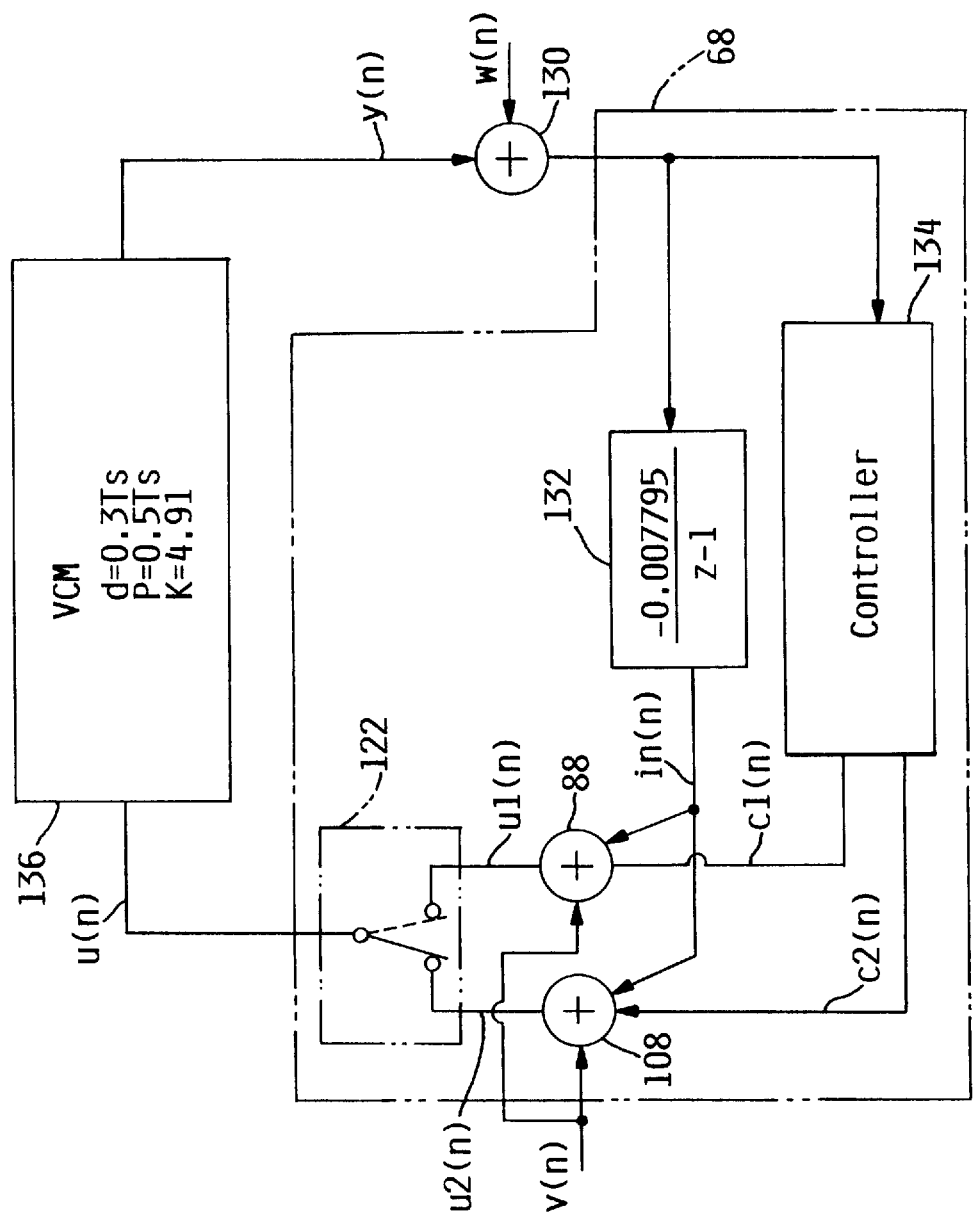
FIG. 8 is a summary block diagram used to explain the white noise which is input as an external disturbance to the closed loop control system of the embodiment when an optimum solution for making the dispersion of the position of the magnetic head minimum is obtained.

Note that a transfer element 132 shown in FIG. 8 is constituted by the summing point 114 performing an integration operation in the main control section 68, the one-sample delay element 116, and the transfer element 118, and in this embodiment the transfer function, ki, of the transfer element 118 is −0.007795. Also, a controller 134 of FIG. 8 is constituted by a plurality of elements of the main control section 68 for generating the first and second control signals c1(n) and c2(n). Also, a voice coil motor (VCM) 136 is constituted by the VCM 26 and the driver 34. The head current position computing section 60, the burst pattern detecting section 62, the head target position setting section 64, and the head position signal generating section 66 are used to detect the magnetic head position and generate the head position signal y(n) and do not have an influence on the position of the magnetic head, so they are omitted in FIG. 8.

Figure 9:
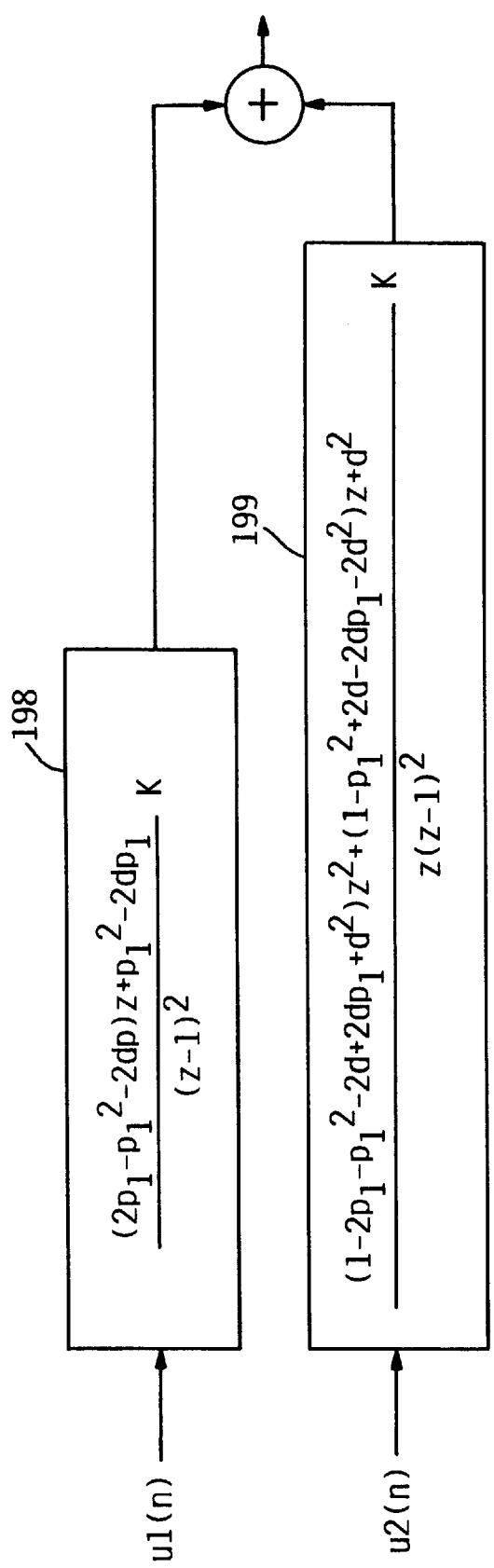
FIG. 9 is a block diagram showing the transfer functions with respect to each signal as first and second motor control signals u1(n) and u2(n) are alternately input to the elements, the elements comprising a voice coil motor and a driver.

In this embodiment of the present invention, the first and second motor control signals u1(n) and u2(n) are alternately output to the VCM 136 at intervals of predetermined time p, which is ½ of the sampling cycle Ts, as described above. The transfer function of the VCM 136 at that time becomes 198, 199 as shown in FIG. 9. In a case (case 3) where the delay time, d, of the transfer function shown in FIG. 9 is d=0.3 Ts, the predetermined time is P=0.5 Ts, the coefficient is K=4.91, and there is no limitation, the optimum solutions of the constants k1, k2, k3, k4, k5, h1, h2, h3, h4, and h5 of Equations (3) and (4) were k1=−0.532, k2=1.07, k3=−0.0126, k4=−0.277, k5=0.0740, h1=0.093, h2=−0.686, h3=−0.145, h4=0.150, and h5=−0.250.

Also, in a case (case 2) where the constants are limited to k4=k5=h1=h2=h3=h4=h5=0, the optimum solutions of k1, k2, and k3 were k1=−0.405, k2=2.281, and k3=−0.450. Note that although a least squares method can apply to the calculation of the optimum solutions, in the above calculation there was used a least steady-state dispersion method that the applicant of the present invention has already proposed (see Masashi Kisaka, "Proposition of Least Steady-State Dispersion Method," Shingaku Journal, vol. J76-A, No. 3(1993), pp 364–371).

Figure 10:
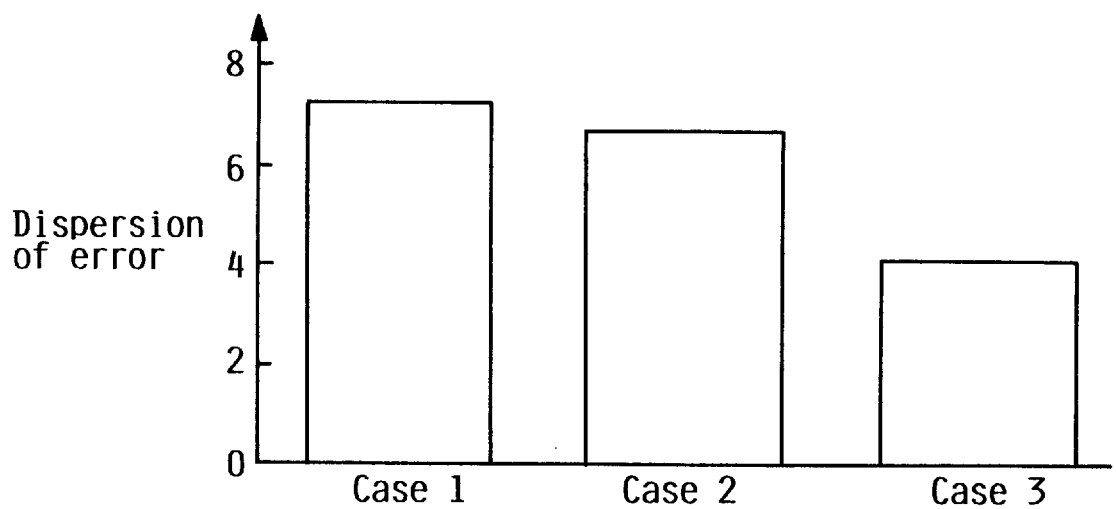
FIG. 10 is a diagram showing the dispersion of the error of the magnetic head position in a case (case 1 where oversampling is not performed, a case (case 2) where an optimum solution is obtained when the values of constants are limited, and a case (case 3) where an optimum solution is obtained when there is no limitation on the values of constants.
Figure 11:
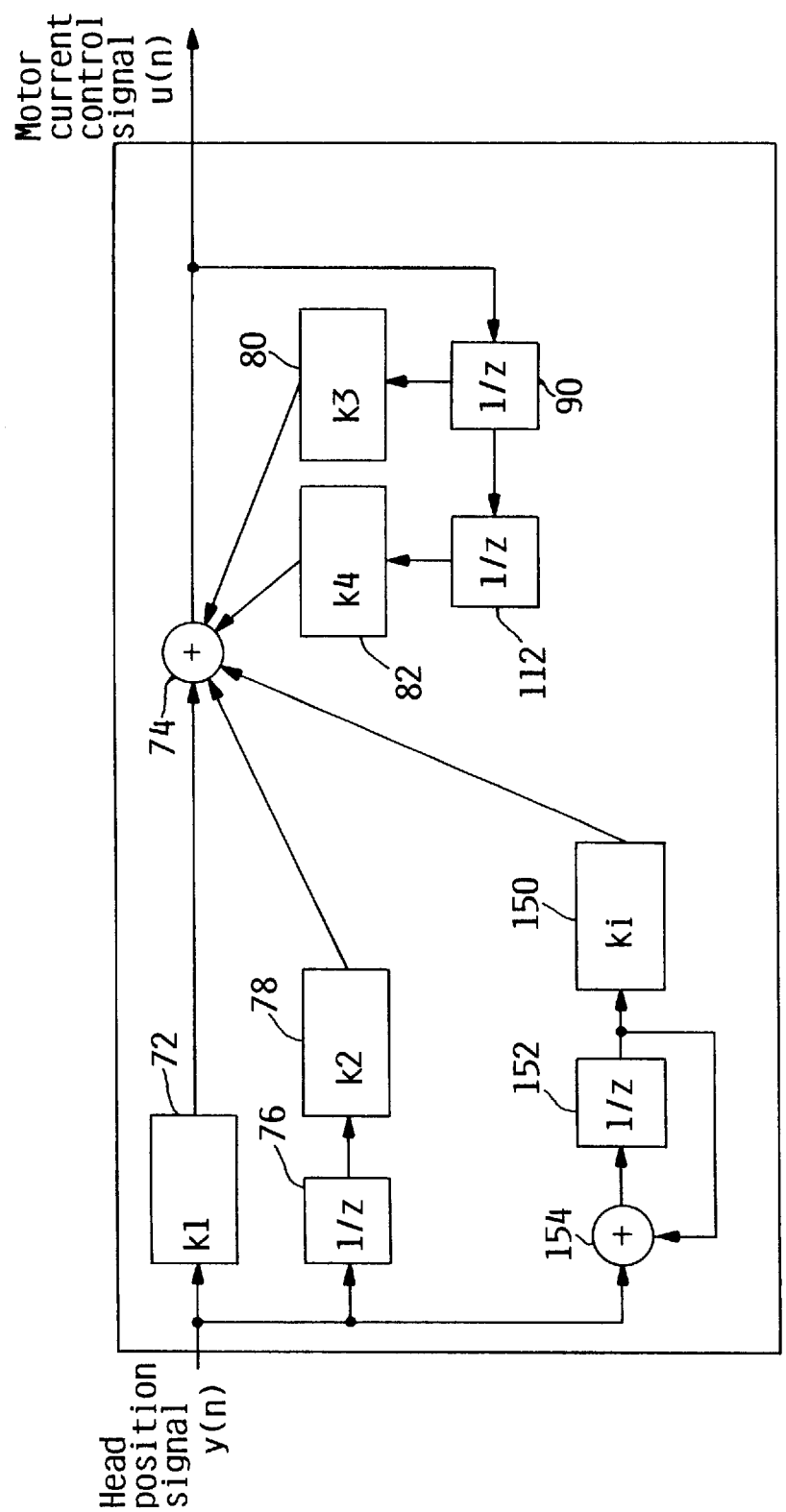
FIG. 11 is a block diagram conceptually showing an example of control elements for generating and outputting a motor current control signal based on an input head position signal, in the control system of a conventional magnetic disk drive.

In order to evaluate the above described cases 2 and 3, if the dispersion of the control error of the magnetic head to external disturbances is calculated for the above-described cases 2, 3 and a case 1 of the conventional closed loop control system (k1=h1, k2=h2, k3=h3, k4=h4, k5=h5=0) where oversampling is not performed, the dispersion of the control error will become as shown FIG. 10. As evident in FIG. 10, even the case 2 where the values of the constants are limited is smaller in value of dispersion of error than the case 1 where oversampling is not performed. From this fact it follows that the positioning accuracy of the magnetic head is enhanced.

While it has been described in the above embodiment that oversampling is performed at a cycle of ½ of the sampling cycle Ts, the present invention is not limited to this. For example, oversampling may be performed at a cycle of 1/integer (for example, ⅓ or ¼) of the sampling cycle Ts.

Also, although the magnetic disk of the hard disk drive has been described as a rotating body, the present invention is not limited to this magnetic disk. The present invention is applicable to data recording medium where a plurality of concentric circular tracks are formed, such as flexible magnetic disks other than hard magnetic disks, optical disks, or optical magnetic disks. The invention is also applicable to other rotating bodies. Thus, the invention is applicable to a wide variety of head positioning controls where the head is positioned over a predetermined position on a rotating body.

As has been described hereinbefore, in the position control apparatus, if the control operation signal is output a manipulation-amount signal representative of an amount of manipulation where amounts of manipulation each corresponding to the control operation signal, executed by a plurality of control operations including an integration operation for matching the position of the object with the target position, are summed up, will be output. Then, an amount of manipulation executed by the control operations other than the integration operation is switched after a second predetermined time shorter than the first predetermined time, and the manipulation-amount signal representative of an amount of manipulation, where amounts of manipulation executed by the plurality of control operations are summed up, is output. With this, the movement of the object by an actuator is controlled. Accordingly, the present invention has the excellent advantage that the positioning accuracy as the object to be controlled is positioned to the target position can be enhanced.

In the preferred embodiment position control method according to the present invention, a control operation signal representative of a deviation between the target position of the object and the detected current position of the object is generated. A manipulation-amount signal representative of an amount of manipulation where amounts of manipulation each corresponding to the control operation signal, executed by a plurality of control operations including an integration operation for matching the position of the object with the target position, are summed up, is output at intervals of first predetermined time, and also, after a second predetermined time shorter than the first predetermined time elapses from the time the manipulation-amount signal is output, an amount of manipulation executed by the control operations other than the integration operation is switched. And, outputting the manipulation-amount signal representative of an amount of manipulation, where amounts of manipulation executed by the plurality of control operation are summed up, is repeated. With this, the movement of the object by an actuator is controlled. Accordingly, the present invention has the excellent advantage that the positioning accuracy as the object to be controlled is positioned to the target position can be enhanced.

What is claimed is:

1. A position control apparatus, comprising:
   (a) detecting means for detecting, at intervals of a first predetermined time, a radial position of an object relative to a rotating body corresponding to an object to be controlled as a current object position;
   (b) signal outputting means, operatively coupled to the detecting means, for generating, at intervals of the first predetermined time, a control operation signal representative of a deviation between a target object position expressed in terms of the radial position of the object relative to the rotating body and the current object position detected by the detecting means; and
   (c) control means, operatively coupled to the signal outputting means, for controlling a movement of the object by an actuator by outputting an actuator manipulation-amount signal derived from the control operation signal, the actuator manipulation-amount signal being formed by selectively summing an integration signal with one of a first and second control signal, the first control signal being a function of the current object position derived from the control operation signal, and the second control signal being a function of a predicted object position at a second predetermined time after generation of the control operation signal which is derived from the control operation signal.

2. The position control apparatus of claim 1 wherein the control means further comprises a switching means for switching an output port between a first and a second manipulation-amount signal at intervals of a third predetermined time shorter than the first predetermined time such that the first and the second manipulation-amount signal are alternately output as the actuator manipulation-amount signal by the control means, the first manipulation-amount signal comprising a sum of the first control signal and the integration signal, and the second manipulation-amount signal comprising a sum of the second control signal and the integration signal.

3. The position control apparatus of claim 2 wherein the second predetermined time is an integer fraction of the first predetermined time.

4. The position control apparatus of claim 1 wherein the first control signal comprises a sum of a plurality of control operations representative of an amount of manipulation of the actuator needed to correct a deviation between the current and target object position.

5. The position control apparatus of claim 1 wherein the rotating body comprises a data recording medium having a plurality of concentric circular tracks formed thereon such that data can be recorded on each track, and wherein the object to be controlled comprises a head which comprises means for reading out data recorded on the tracks of the rotating body.

6. The position control apparatus of claim 5 wherein the data recording medium comprises a magnetic disk of a hard-disk drive and wherein the head comprises a magnetic head of the hard-disk drive which comprises means for reading out data recorded on a track of the magnetic disk.

7. An information recording system, comprising:
(a) a disk, operatively configured for rotation by a rotation mechanism, having data tracks concentrically formed thereon;
(b) a head for reading signals recorded on the data tracks on the disk;
(c) actuator, operatively coupled to the head, for moving the head to access a predetermined data track; and
(d) position control apparatus, comprising: (i) a detector which detects, at intervals of a first predetermined time, a radial position of the head as a current head position, (ii) a signal output which outputs, at intervals of the first predetermined time, a control operation signal representative of a deviation between a target head position and the current head position, and (iii) a controller which controls movement of the head with the actuator by outputting an actuator manipulation-amount signal derived from the control operation signal, the actuator manipulation-amount signal being formed by selectively summing an integration signal with one of a first and a second control signal, the first control signal being a function of the current head position derived from the control operation signal, and the second control signal being a function of a predicted head position at a second predetermined time after generation of the control operation signal which is derived from the control operation signal.

8. The information recording system of claim 7 wherein the position control apparatus controller further comprises a switch mechanism which switches an output port between a first and a second manipulation-amount signal at intervals of a third predetermined time shorter than the first predetermined time such that the first and the second manipulation-amount signal are alternately output as the actuator manipulation-amount signal by the controller, the first manipulation-amount signal comprising a sum of the first control signal and the integration signal, and the second manipulation-amount signal comprising a sum of the second control signal and the integration signal.

9. The information recording system of claim 8 wherein the second predetermined time is an integer fraction of the first predetermined time.

10. The information recording system of claim 7 wherein the first control signal comprises a sum of a plurality of control operations representative of an amount of manipulation of the actuator needed to correct a deviation between the current and target head position.

11. A position control method comprising the steps of:
(a) detecting a radial position of a rotating body corresponding to an object to be controlled as a current object position;
(b) generating a control operation signal representative of a deviation between a target object position expressed in terms of the radial position of the rotating body and the current object position detected;
(c) outputting an actuator manipulation-amount signal derived from the control operation signal, the actuator manipulation-amount signal being formed by selectively summing an integration signal with one of a first and a second control signal, the first control signal being a function of the current object position derived from the control operation signal, and the second control signal being a function of a predicted object position at a second predetermined time after generation of the control operation signal which is derived from the control operation signal; and
(d) repeating steps (a) through (c) at intervals of a first predetermined time such that movement of the object by an actuator is controlled by the actuator manipulation-amount signal.

12. The position control method of claim 11 wherein the outputting step comprises switching between a first and a second manipulation-amount signal at intervals of a third predetermined time such that the first and the second manipulation-amount signal are alternately output as the actuator manipulation-amount signal, the first manipulation-amount signal comprising a sum of the first control signal and the integration signal, and the second manipulation-amount signal comprising a sum of the second control signal and the integration signal.

13. The position control method of claim 12 wherein the second predetermined time is an integer fraction of the first predetermined time.

14. The position control method of claim 11 wherein the first control signal comprises a sum of a plurality of control operations representative of an amount of manipulation of the actuator needed to correct a deviation between the current and target object position.

* * * * *